United States Patent [19]

Beck

[11] Patent Number: 5,713,562
[45] Date of Patent: Feb. 3, 1998

[54] SELF-PUMPING HYDROPNEUMATIC SHOCK ABSORBING STRUT WITH INTERNAL LEVEL REGULATION

[75] Inventor: Hubert Beck, Eitorf-Keuenhof, Germany

[73] Assignee: Fichtel & Sachs AG, Eitorf, Germany

[21] Appl. No.: 761,358

[22] Filed: Dec. 6, 1996

[30] Foreign Application Priority Data

Dec. 7, 1995 [DE] Germany .................. 195 45 661.0

[51] Int. Cl.$^6$ ............................................. B60G 17/00
[52] U.S. Cl. ........................... 267/64.17; 267/DIG. 2
[58] Field of Search ................... 267/64.17, DIG. 2,
267/64.16, DIG. 1, 64.15, 218; 137/527;
251/65; 188/318, 286, 287; 280/708, 714

[56] References Cited

U.S. PATENT DOCUMENTS 3,194,547  7/1965  Avner .................... 267/64.17
4,200,269  4/1980  Ludwig .................. 267/DIG. 2
4,368,878  1/1983  Meller et al. ............ 267/64.17

FOREIGN PATENT DOCUMENTS 1035509  7/1966  United Kingdom.

Primary Examiner—Douglas C. Butler
Attorney, Agent, or Firm—Nils H. Ljungman and Associates

[57] ABSTRACT

Self-pumping hydropneumatic shock absorbing strut with internal level control, in particular for motor vehicles, in which, to regulate the level, a pump which is driven by the movements of the spring transports damping medium from a low pressure chamber which is under a lower pressure into a high pressure chamber which is constantly pressurized by the respective spring force of the shock absorbing strut. During this process, when a specified level is exceeded, the damping medium can flow back into the reservoir via a regulating device, whereby the regulating device is a recess between the work chamber and the low pressure chamber, which regulating device can be controlled by a magnetically actuated closing element.

20 Claims, 3 Drawing Sheets

SELF-PUMPING HYDROPNEUMATIC SHOCK ABSORBING STRUT WITH INTERNAL LEVEL REGULATION

BACKGROUND OF THE INVENTION

1. Field of the Invention

The present invention relates to a self-pumping hydropneumatic shock absorbing strut with internal level control, in particular for motor vehicles, in which, to regulate the level, a pump which is driven by the movements of the spring transports damping medium from a low pressure chamber which is under a lower pressure into a high pressure chamber which is constantly pressurized by the respective spring force of the shock absorbing strut. During this process, when a specified level is exceeded, the damping medium can flow back into the reservoir by means of a regulating device.

2. Background Information

Great Britain patent GB-PS 1,035,509 describes such self-pumping hydropneumatic shock absorbing struts with internal level regulation, in which the pump is constructed without a pump rod, whereby, as a result of the spring movements, the damping medium for the level regulation is transported from a low pressure chamber which is under a lower pressure into a high pressure chamber which is continuously pressurized by the respective spring force of the shock absorbing strut. For the equalization of the pressure from the high pressure chamber to the low pressure chamber, a complex overload or relief valve is necessary, whereby such a construction requires a correspondingly large axial installation space.

OBJECT OF THE INVENTION

The object of the invention is to improve a self-pumping hydropneumatic shock absorbing strut so that a simple, automatic regulating device which operates as a function of pressure and/or distance can be created from a few simple components.

SUMMARY OF THE INVENTION

The present invention teaches that this object can be achieved by the use of a regulating device which includes a recess or passage between the work chamber and the low pressure chamber, which regulating device can be controlled by means of a magnetically actuated closing element.

One advantage of the solution taught by the invention is that the discharge boring in a non-magnetic cylinder tube or also in a non-magnetic portion of the cylinder tube can be controlled by a magnetically actuated closing element. By interaction with the piston rod, the closing element can perform an overload or relief function which can protect the device. When the piston moves past the discharge boring, the damping medium can flow from the high pressure chamber into the low pressure chamber.

According to an additional characteristic, the invention teaches that there can be a magnet which corresponds to the closing element and/or the closing element can be made, at least in part, of magnetic material. The magnet can advantageously be a permanent magnet.

In an additional embodiment, the work cylinder can include a non-magnetic material in the vicinity of the regulating device.

For correct operation, when the closing element is provided with a permanent magnet, the invention teaches that at least the area of the piston rod which faces the regulating device can be made of magnetic material.

In one embodiment which is favorable from a manufacturing point of view, a boring, hole or bored hole can be provided as the recess.

In an additional embodiment, the closing element can have a seal element. The seal element can advantageously have an elastic area.

In an additional embodiment, the closing element can be located on a part which is resiliently or flexibly connected to the work cylinder.

By setting a corresponding magnetic force, the closing element can be made to open as a function of pressure or distance.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Preferred embodiments of the invention are schematically illustrated in the accompanying drawings, in which.

DESCRIPTION OF TEE PREFERRED EMBODIMENT

Figure 1:
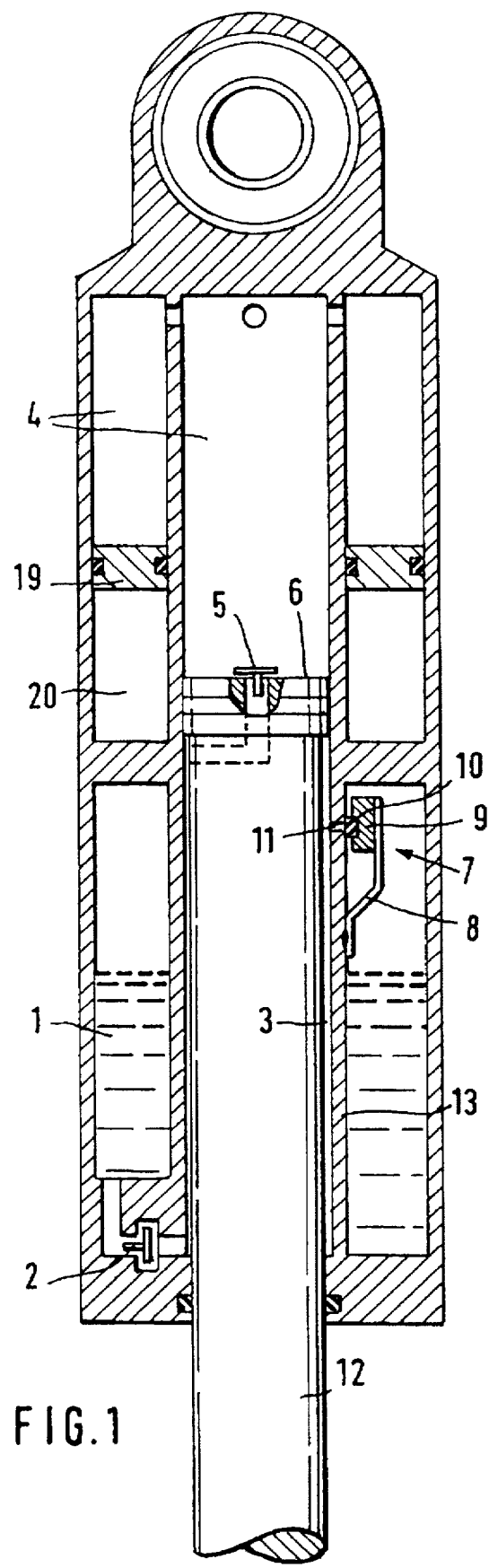
FIGS. 1 and 2 each show a sectional view through a self-pumping hydropneumatic shock absorbing strut.

The self-pumping hydropneumatic shock absorbing strut illustrated in FIG. 1 includes a work cylinder 13, a piston rod 12 and a piston 6, as well as a low pressure chamber 1 and a high pressure chamber 4. The high pressure chamber 4 is divided by means of a ring-shaped separating piston 19 into a gas chamber 20 and the chamber 4 which is filled with damping medium. Between the piston rod 12 and the work cylinder 13 is a pump chamber 3 which is connected to the low pressure chamber 1 by means of a regulating device 7. There is also a non-return valve 2 which provides the flow connection between the low pressure chamber 1 and the pump chamber 3.

There is also a flow connection to the high pressure chamber 4 from the pump chamber 3 by means of a non-return valve 5. FIG. 1 shows the shock absorbing strut in the pumping-up or pressurization or compression phase, whereby the damping medium flows out of the low pressure chamber 1 via the non-return valve 2 into the pump chamber 3. The high pressure chamber 4 which is under an initial gas pressure holds the non-return valve 5 in the closed position and pressurizes the surface of the piston 6. In the decompression stage, the non-return valve 2 closes and the damping medium from the pump chamber 3 travels via the non-return valve 5 into the high pressure chamber 4. As a result of the in-and-out movements of the piston rod 12, the damping medium is continuously pumped from the low pressure chamber 1 into the high pressure chamber 4.

The regulating device 7 includes a resilient or flexible part 8 and a closing element 9, which keeps a recess or passage 11 of the work cylinder 13 closed by means of a seal element 10.

In one embodiment of the present invention, the passage 11 can consist of a bored hole through the work cylinder 13.

In the pumping-up phase illustrated in FIG. 1, the closing element 9, which closing element 9 is realized in the form of a permanent magnet is pressurized by the piston rod 12 and thereby closes the recess 11. The magnetic force of the permanent magnet can be selected so that the recess 11 is opened above a specified pressure in the pump chamber 3. From this time forward, the damping medium from the pump chamber 3 is no longer pumped into the high pressure chamber 4, but directly into the low pressure chamber 1. The regulating device 7 also prevents the penetration of the gas in the low pressure chamber 1 into the pump chamber 3.

In one embodiment of the present invention, the regulating device 7 can be designed so that the regulating device 7 can unblock the passage 11 if the pressure in the pump chamber 3 exceeds a predetermined pressure. This can be done by limiting the magnetic field of the permanent magnet to a level that is only sufficient to hold the closing element 9 in the blocked position up to a certain pressure differential between the pump chamber 3 and the low pressure chamber. 1. In the event the pressure differential between the low pressure chamber 1 and the pump chamber 3 passes the predetermined threshold, the passage 11 can be unblocked and the damping medium can be allowed to flow from the pump chamber 3 into the low pressure chamber 1.

Figure 2:
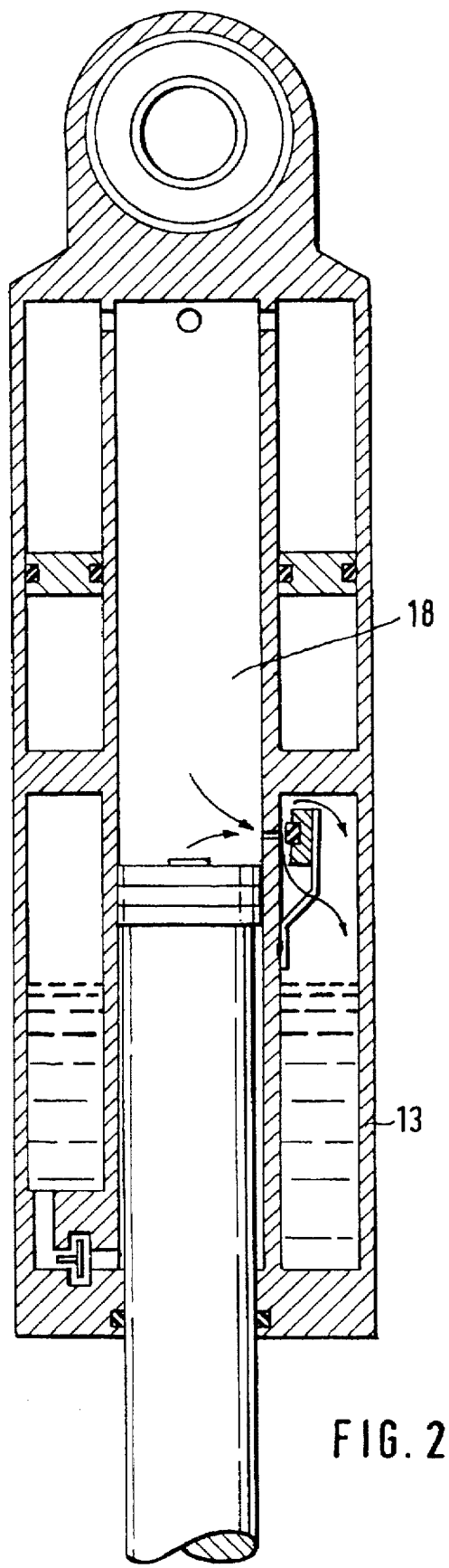

FIG. 2 illustrates a shock absorbing strut in the regulation phase. The piston rod 12, together with the piston 6, is below the recess 11, so that the permanent magnet of the regulating device 7 is no longer in the field of action of the piston rod 12. When there is a corresponding pressure in the high pressure chamber 4, the closing element 9 then opens and releases the recess 11, so that a corresponding pressure equalization can take place between the high pressure chamber 4 and the low pressure chamber 1.

In an embodiment of the present invention, there is a work chamber 18, which is open to the high pressure chamber 4 which is aligned with the recess 11 when the piston 6 is below the recess 11.

Figure 3:
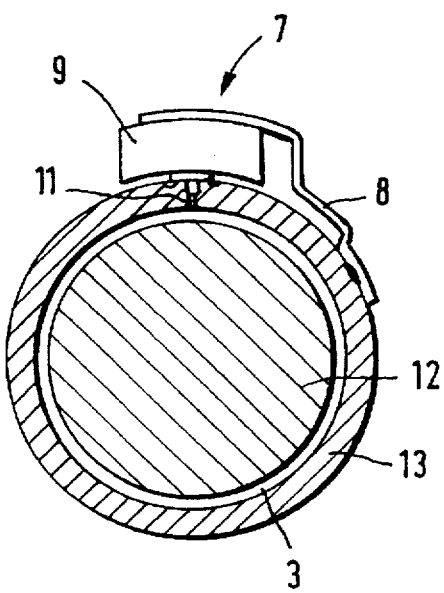
FIGS. 3, 4, 5 and 6 illustrate various embodiments of the closing element, each in cross section.

FIG. 3 shows, in cross section, the work cylinder 13, the pump chamber 3 and the piston rod 12. Located in the work cylinder 13 is the recess 11 which is pressurized or actuated by the regulating device 7. The closing element 9 is thereby realized directly in the form of a permanent magnet and is connected to the work cylinder 13 on a resilient part 8 which runs in the peripheral direction. The closing element 9 is thereby controlled directly, because the closing element 9 is realized in the form of a permanent magnet and acts directly on the recess 11. The piston rod 12 is thereby made of magnetic material, and can be either solid or in the form of a tubular component.

Figure 4:
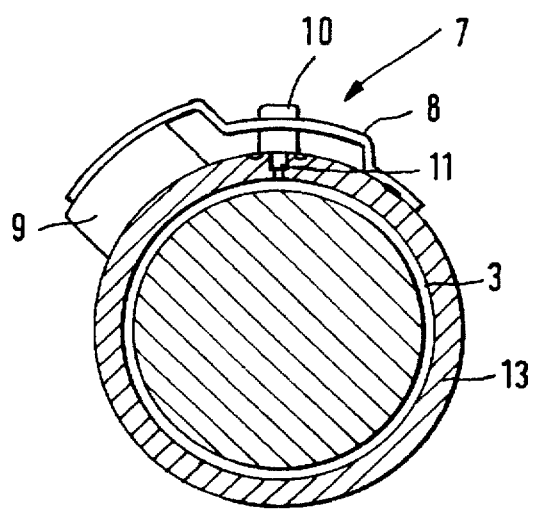

FIG. 4 illustrates an additional embodiment of a regulating device 7, in which once again the work cylinder 13 has the recess 11, with the distinction that the closing element 9 is located at some distance from the recess 11, whereby a seal element 10 controls the recess 11 between the fastening of the resilient part 8 on the work cylinder 13 and the closing element 9 which is realized in the form of a permanent magnet. Since the permanent magnet in the form of the closing element 9 is at some distance from the recess 11, the recess 11 is correspondingly protected against the penetration of dirt. Any metallic particles which do occur settle not in the vicinity of the recess 11 but in the vicinity of the permanent magnet.

Figure 4A:
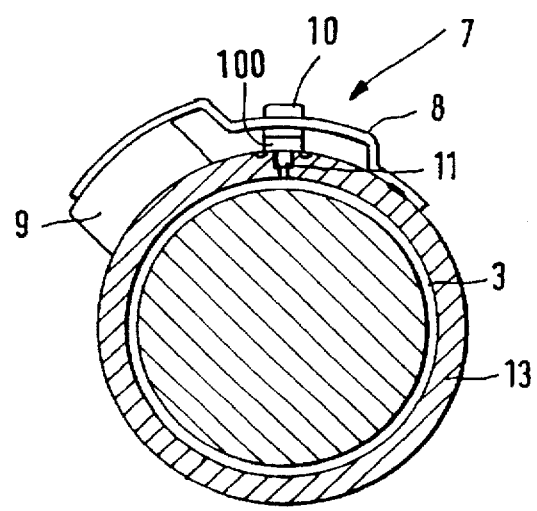
FIG. 4a shows the same cross section as FIG. 4 in additional detail.

FIG. 4a illustrates the embodiment shown in FIG. 4 additionally showing an elastic region 100 of the seal element 10.

Figure 5:
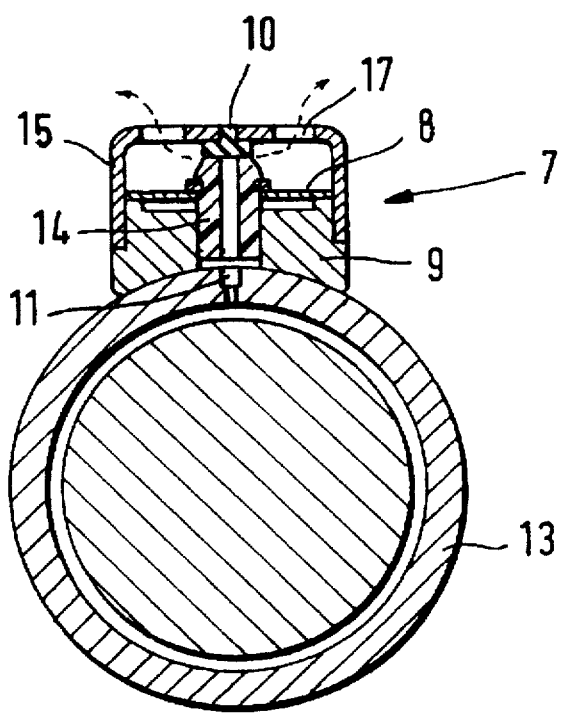

FIG. 5 illustrates an additional embodiment of a regulating device 7, in which the recess 11 in the work cylinder 13 is extended by means of a nonmagnetic component 14, whereby the seal element 10 corresponds to this nonmagnetic component. The closing element 9 is in turn realized in the form of a ring-shaped permanent magnet, and is connected to the seal element 10 by means of the housing 15, whereby the resilient part 8 is realized in the form of a spring or elastic washer and the seal element 10 is held with a slight bias in the closed position on the recess 11.

In an embodiment of the present invention, there is an opening 17, provided in the housing 15 whereby the damping medium can be returned to the low pressure chamber 1 (see FIG. 2) after exiting the recess 11.

Figure 6:
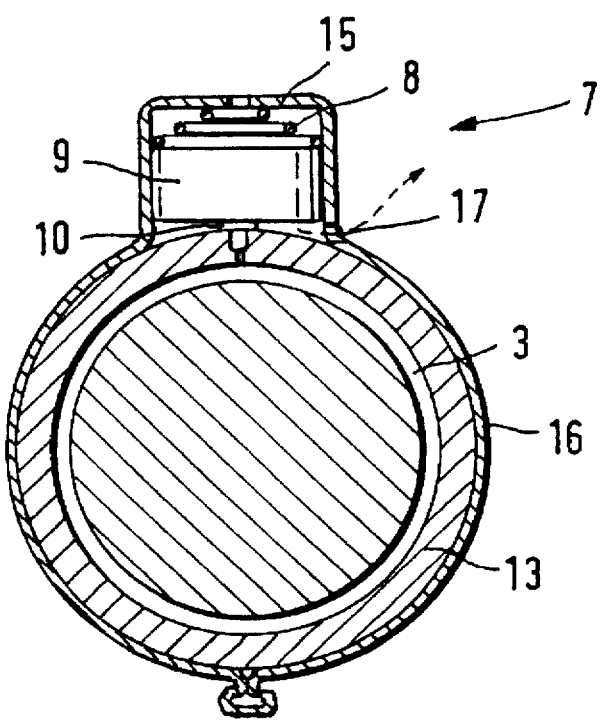

FIG. 6 illustrates an additional embodiment of a regulating device 7, whereby the work cylinder 13 is surrounded by a cylindrical nonmagnetic component 16, which simultaneously forms the housing 15 of the closing element 9. The closing element 9 in turn contains the permanent magnet as well as the seal element 10, and is actuated by the resilient part 8. The resilient part 8 is in the form of a coil spring. The housing 15 is thereby provided with an opening 17 for the passage of the damping medium out of the pump chamber 3.

One feature of the invention resides broadly in the self-pumping hydropneumatic shock absorbing strut with internal level control, in particular for motor vehicles, in which, to regulate the level, a pump which is driven by the movements of the spring transports damping medium from a low pressure chamber which is under a lower pressure into a high pressure chamber which is constantly pressurized by the respective spring force of the shock absorbing strut, and during which process, when a specified level is exceeded, the damping medium can flow back into the reservoir by means of a regulating device, characterized by the fact that as the regulating device 7 there is a recess 11 between the work chamber 18 and the low pressure chamber 1, which regulating device can be controlled by means of a magnetically actuated closing element 9.

Another feature of the invention resides broadly in the shock absorbing strut characterized by the fact that corresponding to the closing element 9 there is a magnet, and/or the closing element 9 is made at least partly of magnetic material.

Yet another feature of the invention resides broadly in the shock absorbing strut characterized by the fact that the magnet is a permanent magnet.

Still another feature of the invention resides broadly in the shock absorbing strut characterized by the fact that the work cylinder 13 is made of non-magnetic material in the vicinity of the regulating device 7.

A further feature of the invention resides broadly in the shock absorbing strut characterized by the fact that at least the portion of the piston rod 12 which faces the regulating device 7 is made of magnetic material.

Another feature of the invention resides broadly in the shock absorbing strut characterized by the fact that the recess 11 is a boring.

Yet another feature of the invention resides broadly in the shock absorbing strut characterized by the fact that the closing element 9 has a seal element 10.

Still another feature of the invention resides broadly in the shock absorbing strut characterized by the fact that the seal element 10 has an elastic area.

A further feature of the invention resides broadly in the shock absorbing strut characterized by the fact that the closing element 9 is located on a part 8 which is resiliently connected to the work cylinder 13.

Another feature of the invention resides broadly in the shock absorbing strut characterized by the fact that the closing element 9 opens as a function of the pressure.

Yet another feature of the invention resides broadly in the shock absorbing strut characterized by the fact that the closing element 9 opens as a function of travel.

Examples of non-magnetic materials which may be incorporated in embodiments of the present invention may be found in the following U.S. Pat. No. 5,479,309; No. 5,468, 522; No. 5,448,806; No. 5,411,701; No. 5,385,618; No. 5,294,268; and No. 5,242,655.

Examples of magnetic materials which may be incorporated in embodiments of the present invention may be found in the following U.S. Pat. No. 5,478,416; No. 5,405,646; No. 5,382,303; No. 5,225,006; No. 5,211,771; No. 5,209,789; No. 5,192,375; No. 5,186,761; No. 5,183,516; and No. 5,180,445.

Examples of hydropneumatic struts with internal level regulation, components of which may be used in conjunction with embodiments of the present invention, can be found in the following U.S. Pat. No. 4,993,693; No. 4,577, 840; No. 4,502,672; and No. 4,502,672.

Examples of shock absorbers which may be used in conjunction with embodiments of the present invention, can be found in the following U.S. Pat. No. 5,551,541; No. 5,547,050; No. 5,522,483; No. 5,509,512; No. 5,480,129; No. 5,477,949; No. 5,467,851; No. 4,850,460; No. 4,802, 561; No. 4,785,920; and No. 4,650,042.

The following U.S. patent applications: Ser. No. 08/760, 882, filed on Dec. 6, 1996, attorney docket no. NHL-FIS-237, corresponding to Federal Republic of Germany Patent Application no. 195 45 662.9-21; Ser. No. 08/772,180, filed on Dec. 19, 1996, attorney docket no. NHL-FIS-234, corresponding to Federal Republic of Germany Patent Application no. 195 47 535.6-12; and Ser. No. 08/769,663, filed on Dec. 19, 1996, attorney docket no. NHL-FIS-235, corresponding to Federal Republic of Germany Patent Application no. 195 47 536.4.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A self-pumping hydropneumatic shock absorbing strut with internal level control for a motor vehicle, said shock absorbing strut comprising:

a work cylinder having a first end and a second end;

a piston rod;

a piston mounted on said piston rod;

said second end of said work cylinder having a piston rod hole therethrough;

said piston being disposed for movement within said work cylinder with said piston rod extending through said piston rod hole in said second end;

said work cylinder including a supply of damping medium for damping movement of said piston within said work cylinder;

said piston being disposed within said work cylinder to define a work chamber between said first end of said work cylinder and said piston;

a reservoir for storing said damping medium;

a regulating device;

said regulating device comprising:

a passage disposed between said reservoir and said work chamber for permitting said damping medium to flow between said work chamber and said reservoir;

means for blocking flow of said damping medium through said passage between said reservoir and said work chamber;

said blocking means comprising a blocking structure for blocking said passage; and said blocking structure comprising a magnetic element.

2. The shock absorbing strut as claimed in claim 1 wherein said magnetic element comprises a permanent magnet.

3. The shock absorbing strut as claimed in claim 2 wherein:

at least a portion of said work cylinder comprises a non-magnetic material; and said at least a portion of said work cylinder is disposed adjacent said regulating device.

4. The shock absorbing strut as claimed in claim 3 wherein said passage comprises a bored hole between said reservoir and said work chamber.

5. The shock absorbing strut as claimed in claim 4 wherein at least a portion of said piston rod comprises a magnetic material.

6. The shock absorbing strut as claimed in claim 5 wherein:

said at least a portion of said piston rod is movable into a first operative position and a second operative position;

said first operative position of said at least a portion of said piston rod is substantially adjacent said bored hole to permit said magnetic element to block said bored hole; and said second operative position of said at least a portion of said piston rod is a substantial distance from said first operative position to thereby permit flow of the damping medium through said passage and between said work chamber and said reservoir.

7. The shock absorbing strut as claimed in claim 6 comprising:

a pump chamber;

said pump chamber being disposed about said piston rod;

said pump chamber containing pressurized damping medium;

said passage being adjacent said pump chamber when said at least a portion of said piston rod is in said first operative position; and said blocking means comprising means for relieving pressure in said pump chamber when said pressurized damping medium in said pump chamber is pressurized past a predetermined pressure.

8. The shock absorbing strut as claimed in claim 7 wherein:

said blocking means comprises a connecting part;

said connecting part comprises a first end and a second end;

said first end of said connecting part is fixedly connected to said magnetic element; and said second end of said connecting part is fixedly connected to said work cylinder.

9. The shock absorbing strut as claimed in claim 8 wherein said magnetic element is disposed immediately adjacent said bored hole.

10. The shock absorbing strut as claimed in claim 9 wherein:

said blocking means comprises a sealing element;

said sealing element is disposed between said magnetic element and said bored hole.

11. The shock absorbing strut as claimed in claim 10 comprising:

a high pressure chamber;

a gas chamber;

a ring shaped separating piston;

said ring shaped separating piston being disposed between said gas chamber and said high pressure chamber;

said high pressure chamber comprising said work chamber;

said reservoir comprises a low pressure chamber;

a flow path for permitting flow of said damping medium from said low pressure chamber to said work chamber upon operation of said piston;

said flow path comprising:

a first non-return valve;

said first non-return valve being operatively disposed to permit flow of said damping medium from said low pressure chamber to said pump chamber;

a second non-return valve; and said second non-return valve being disposed to permit flow of said damping medium from said pump chamber to said high pressure chamber.

12. The shock absorbing strut as claimed in claim 9 comprising:

a high pressure chamber;

a gas chamber;

a ring shaped separating piston;

said ring shaped separating piston being disposed between said gas chamber and said high pressure chamber;

said high pressure chamber comprising said work chamber;

said reservoir comprises a low pressure chamber;

a flow path for flow of said damping medium from said low pressure chamber to said work chamber upon operation of said piston;

said flow path comprising:

a first non-return valve;

said first non-return valve being operatively disposed to permit flow of said damping medium from said low pressure chamber to said pump chamber;

a second non-return valve; and said second non-return valve being disposed to permit flow of said damping medium from said pump chamber to said high pressure chamber.

13. The shock absorbing strut as claimed in claim 8 wherein said blocking means comprises a sealing element.

14. The shock absorbing strut as claimed in claim 13 wherein:

said sealing element is disposed on said connecting part;

said sealing element is disposed between said first end of said connecting part and said second end of said connecting part; and said sealing element is disposed substantially adjacent said bored hole.

15. The shock absorbing strut as claimed in claim 14 wherein said sealing element has an elastic area.

16. The shock absorbing strut as claimed in claim 15 comprising:

a high pressure chamber;

a gas chamber;

a ring shaped separating piston;

said ring shaped separating piston being disposed between said gas chamber and said high pressure chamber;

said high pressure chamber comprising said work chamber;

said reservoir comprises a low pressure chamber;

a flow path for flow of said damping medium from said low pressure chamber to said work chamber upon operation of said piston;

said flow path comprising:

a first non-return valve;

said first non-return valve being operatively disposed to permit flow of said damping medium from said low pressure chamber to said pump chamber;

a second non-return valve; and said second non-return valve being disposed to permit flow of said damping medium from said pump chamber to said high pressure chamber.

17. The shock absorbing strut as claimed in claim 7 wherein:

said blocking means comprises:

a non-magnetic component;

a resilient part;

a sealing element; and a housing;

said non-magnetic component has a first end and a second end disposed a substantial distance from one another;

said first end of said non-magnetic component is disposed adjacent said bored hole and said second end is disposed adjacent said sealing element;

said permanent magnet comprises a ring shaped permanent magnet;

said ring shaped permanent magnet is disposed around said non-magnetic component;

said housing substantially encloses said sealing element;

said housing is encloses at least a portion of said ring shaped permanent magnet;

said resilient part is disposed within said housing;

said resilient part is disposed to bias said sealing element away from said non-magnetic component; and said housing comprises at least one opening to allow flow of said damping medium from said housing to said reservoir.

18. The shock absorbing strut as claimed in claim 17 comprising:

a high pressure chamber;

a gas chamber;

a ring shaped separating piston;

said ring shaped separating piston being disposed between said gas chamber and said high pressure chamber;

said high pressure chamber comprising said work chamber;

said reservoir comprises a low pressure chamber;

a flow path for flow of said damping medium from said low pressure chamber to said work chamber upon operation of said piston;

said flow path comprising:
 a first non-return valve;
  said first non-return valve being operatively disposed to permit flow of said damping medium from said low pressure chamber to said pump chamber;
 a second non-return valve; and
  said second non-return valve being disposed to permit flow of said damping medium from said pump chamber to said high pressure chamber.

19. The shock absorbing strut as claimed in claim 7 wherein:

said blocking means comprises:
 a non-magnetic component;
 a resilient part; and
 a sealing element;

said non-magnetic component comprises a substantially cylindrical portion;

said substantially cylindrical portion of said non-magnetic component is disposed around said work cylinder;

said non-magnetic component comprises a housing;

said housing is disposed substantially adjacent said passage;

said sealing element is disposed within said housing and immediately adjacent said passage;

said magnetic element is disposed within said housing and is connected to said sealing element;

said resilient part is disposed within said housing and is in contact with said magnetic element;

said housing comprises at least one opening to allow flow of said damping medium from said housing to said reservoir.

20. The shock absorbing strut as claimed in claim 19 comprising:

a high pressure chamber;

a gas chamber;

a ring shaped separating piston;

said ring shaped separating piston being disposed between said gas chamber and said high pressure chamber;

said high pressure chamber comprising said work chamber;

said reservoir comprises a low pressure chamber;

a flow path for flow of said damping medium from said low pressure chamber to said work chamber upon operation of said piston;

said flow path comprising:
 a first non-return valve;
  said first non-return valve being operatively disposed to permit flow of said damping medium from said low pressure chamber to said pump chamber;
 a second non-return valve; and
  said second non-return valve being disposed to permit flow of said damping medium from said pump chamber to said high pressure chamber.

* * * * *